US005116555A

United States Patent [19]

Thole et al.

[11] Patent Number: 5,116,555

[45] Date of Patent: May 26, 1992

[54] METHOD OF AND APPARATUS FOR CONTROLLING THE MANUFACTURING PROCESS IN THE CONTINUOUS PRODUCTION OF GYPSUM-CEMENTED WORKPIECES

[75] Inventors: Volker Thole; Thomas Hilbert, both of Braunschweig, Fed. Rep. of Germany

[73] Assignee: Fraunhofer-Gesellschaft zur Forderung der angewandten Forschung eV, Munich, Fed. Rep. of Germany

[21] Appl. No.: 617,763

[22] Filed: Nov. 26, 1990

[30] Foreign Application Priority Data

Nov. 28, 1989 [DE] Fed. Rep. of Germany ....... 3939280

[51] Int. Cl.[5] ........................ B28B 3/06; B29C 39/16; B30B 5/06; B30B 15/14

[52] U.S. Cl. .................................... 264/40.5; 100/41; 100/48; 100/154; 264/165; 264/175; 264/212; 264/297.1; 264/333; 425/141; 425/149; 425/150; 425/371

[58] Field of Search .................... 264/40.1, 40.3, 40.4, 264/40.5, 165, 212, 333, 175, 297.1; 425/141, 149, 371, 150; 100/35, 41, 48, 152, 154

[56] References Cited

U.S. PATENT DOCUMENTS

| | | | |
|---|---|---|---|
| 3,706,516 | 12/1972 | Kisteneich et al. | 425/149 X |
| 3,792,953 | 2/1974 | Ahrweiler | 425/371 |
| 3,795,470 | 3/1974 | De Mets | 425/371 |
| 4,017,235 | 4/1977 | Ahrweiler | 425/149 |
| 4,017,248 | 4/1977 | Dieffenbacher et al. | 425/149 X |
| 4,029,456 | 6/1977 | Ahrweiler | 425/149 |
| 4,042,314 | 8/1977 | Brüning et al. | 425/149 X |
| 4,278,624 | 7/1981 | Kornylak | 425/149 X |
| 4,311,632 | 1/1982 | Hiraoka | 425/149 X |
| 4,545,946 | 10/1985 | Sarja | 425/371 X |
| 4,626,389 | 12/1986 | Lempfer et al. | 264/40.7 |
| 4,725,389 | 2/1988 | Hahn et al. | 425/149 X |

FOREIGN PATENT DOCUMENTS

| | | | |
|---|---|---|---|
| 2208765 | 9/1972 | Fed. Rep. of Germany | 425/371 |
| 3316946 | 11/1984 | Fed. Rep. of Germany . | |
| 514429 | 12/1971 | Switzerland | 425/149 |

*Primary Examiner*—Karen Aftergut
*Attorney, Agent, or Firm*—Dennison, Meserole, Pollack & Scheiner

[57] ABSTRACT

A method for controlling the manufacturing process in the continuous production of gypsum-cemented workpieces utilizing a belt-type press or similar equipment including a number of press segments joined in tandem relationship. Utilizing this press, the gypsum undergoing hydration is compacted until the end of the hydration is reached. The swelling pressure created in the course of the hydration is measured and utilized to control the manufacturing process.

10 Claims, 4 Drawing Sheets

METHOD OF AND APPARATUS FOR CONTROLLING THE MANUFACTURING PROCESS IN THE CONTINUOUS PRODUCTION OF GYPSUM-CEMENTED WORKPIECES

BACKGROUND OF THE INVENTION

1. Field of the Invention

The present invention relates to the manufacturing process for continuous production of gypsum-cemented workpieces, such as plasterboards and chipboards.

DESCRIPTION OF RELATED ART

German Patent DE 33 16 946 discloses a control system for a compacting unit in a belt-type press. This disclosure takes advantage of the exothermic nature of the reaction of cementing or binding material with water to form raw gypsum, i.e., heat is released. It is therefore possible to determine the end of hydration by an analysis of the hydration temperature graph versus time, specifically as the time by which the feeding step starts up to the maximum of the temperature curve. In laboratory tests, this measurement is mostly carried out under quasi-adiabatic conditions such that a heat dissipation and thus an adulteration of the temperature/time graph will be avoided. In industrial processes it is normally sufficient to establish the temperature derivative trend under the prevailing conditions.

In the method to be carried out by means of that control system, the variation of the temperature of the exothermically curing gypsum-cementing material is employed as the control variable. In accordance with the definition, the end of hydration is reached as soon as the temperature derivative trend exceeds a maximum level. The realization of that method requires, however, a measuring system which determines the temperature variation continuously, so that an additional apparatus is required apart from the pressure-measuring system already provided. This temperature measurement involves not only a considerable expenditure in terms of equipment but also instability factors which prevent an exact determination of the actual values. In this respect, temperature equalizing processes occurring between the material, the compacting unit and the environment must be cited as disturbance factors which cannot be compensated economically. Under the conditions prevailing in practice, it is questionable whether variations in temperature of the materials should not be deemed to be erroneous measurements.

Both continuous and discontinuous methods may be applied in principle for compaction. The aspect in common to the most important continuous methods is the use of a belt-type press consisting of a plurality of individual press segments joined in tandem (FIG. 1). Such a press is described, for instance, by H. Soiné in "Holz als Roh- und Werkstoff [Wood as Raw and Processing Material]", No. 42 (1984), pages 63 to 66. The present invention is based on such belt-type presses including press segments joined in tandem.

SUMMARY OF THE INVENTION

It is the object of the present invention to provide a less complex and less expensive method of controlling the manufacturing process for gypsum-cemented workpieces and to define a suitable apparatus to this end.

To achieve this and other objects, the invention provides for measurement of the swelling pressure in the course of hydration, and application of the swelling pressure to control the manufacturing process.

The invention also provides an apparatus comprising a belt-type slab press having segments each including distance measuring means, a reference/actual-value comparator, a pump to deliver a pressure medium for actuating the press segments, and means for measuring the swelling pressure of the gypsum being compacted.

For a better understanding of the present invention, the fundamentals of the setting mechanism of exothermically curing cementing materials should be considered with reference to the example of gypsum. Dehydration and rehydration processes are the basis for the manufacture of gypsum-based products. In the calcination of raw gypsum ($CaSO_4.2H_2O$), a dehydration process occurs to produce, under appropriate calcining conditions, sulfated cementing substances which consist essentially of hemihydrate gypsum ($CaSO_4.\frac{1}{2}H_2O$).

When the cementing material is mixed with water, the hemihydrate gypsum is dissolved up to the saturation concentration; as a result of hydration, raw gypsum is formed again whose solubility corresponds approximately to a value as low as one-fourth of the solubility of the hemihydrate gypsum, so that raw gypsum is precipitated in crystalline form from the solution supersaturated with raw gypsum. This process is continued until the entire hemihydrate gypsum component is completely converted into raw gypsum, with a polycrystalline solid body of constant volume being formed in this process.

The chronological sequence of the hydration process is characterized in industry by the parameters at the beginning of the thickening step, at the end of the thickening step, and at the end of hydration. In such a definition, the terms at the beginning and end of the thickening step determine a certain consistency of the gypsum mixture, while the end of the hydration step marks the end of the conversion of the hemihydrate gypsum into raw gypsum. Each of these time coefficients is defined to start from the time by which "feeding begins", i.e., from the point of time at which the cementing material is contacted with water.

In the manufacture of certain slab-type or board-type workpieces based on gypsum, e.g., in the manufacture of fiber-reinforced plasterboards or gypsum-cemented chipboards in a semi-dry process, a compacting process is carried out. In accordance with the state of the art, the rule applies that the compacting operation must commence by or before the beginning of the thickening step and must not be terminated before the end of the thickening step, preferably after the end of hydration only; the maximum mechanical strength of the material will be ensured only in this way.

The aforementioned methods of production may be carried out with continuously operating machinery which allows for improved production capacities, compared with discontinuously operating installations, and wherein a continuous mixing and shaping is possible which is expedient in terms of production engineering. Such machinery is illustrated in FIG. 1.

On a belt-type press of this type, the freshly mixed or primary material is compacted after feeding, and up to the end of hydration. The increase in volume of the cured cementing material, which occurs in the production methods so far applied, is thereby restrained. It is for this reason that a swelling pressure is created which can be measured.

According to the present invention this swelling pressure is applied to control the manufacturing process.

The end of the hydration step is achieved whenever an increase of the swelling pressure can no longer be detected. FIG. 2 illustrates a temperature vs. time curve in contrast to the pressure vs. time curve. This graph illustrates that the measurement of the swelling pressure furnishes the same results as the measurement of temperature. Compared against prior art, the present invention entails decisive advantages in that additional temperature measuring equipment is not required, and the measurement of the swelling pressure does not depend on environmental factors.

The present invention entails other advantages, as well. For example, it is possible in accordance with the invention to set the next press segments to zero pressure when the maximum swelling pressure and thus the end of hydration is reached. This provision contributes to substantial energy savings. This aspect is relevant for the reason that the behavior in setting may be influenced within a defined range by the admixture of standardizing agents (retarding/accelerating additives). It is thus possible, for instance, to admix an accelerating additive n order to achieve an earlier end of hydration so that a "shorter" belt-type press would actually be sufficient. In the inventive method, however, the following press segments are reset to zero pressure after the end of hydration so that they will discontinue operation, thus saving energy. In all prior art methods, such a selective fine adjustment is not possible. In all of these prior art processes, the belt-type press must continue its operation up to the end of the line over-all length. The inventive method is therefore apt to save the work which the press segments need not perform after the end of hydration has been reached. The next press segment is returned to zero pressure when the conjugate conditions $P_{(n-1)} < Pn$ and $P_{(n+1)} \leqq P_n$ in terms of pressure P and press segment n is satisfied.

In accordance with the present invention, it is equally possible, of course, to stop the compaction step at a desired swelling pressure level. This feature may be of interest, for instance, in research into the mechanism of setting. In another embodiment of the present invention, it is also possible to operate on the differential quotient as a derivative of pressure per unit time (dP/dt) rather than on the absolute pressure for control of the manufacturing process.

BRIEF DESCRIPTION OF THE DRAWINGS

The apparatus according to the present invention for carrying out this method will be explained in more detail with reference to the drawings, in which.

DESCRIPTION OF THE PREFERRED EMBODIMENTS

Figure 1A:
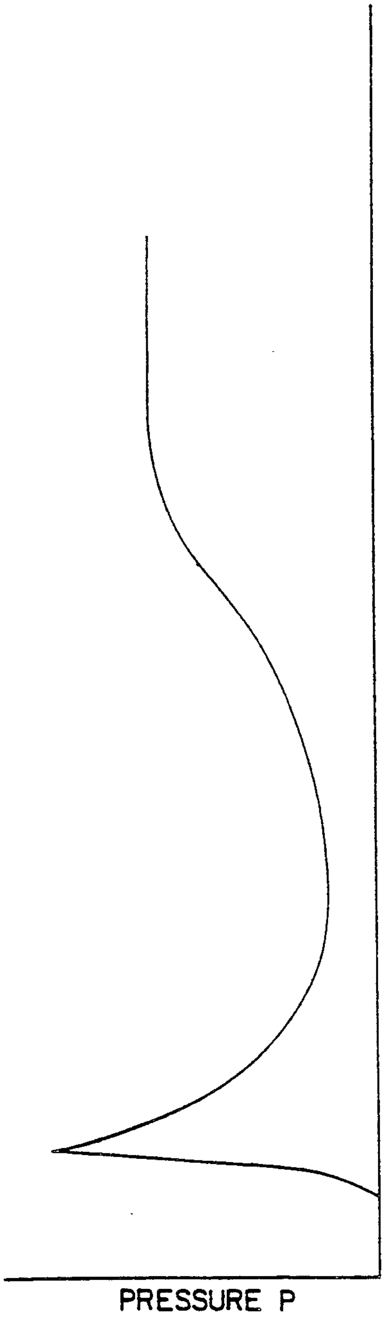
FIG. 1A PRIOR ART
FIG. 1 shows schematically the overall structure of a continuous belt-type press, and a curve of pressure vs. time for gypsum being compacted by the press.
Figure 1B:
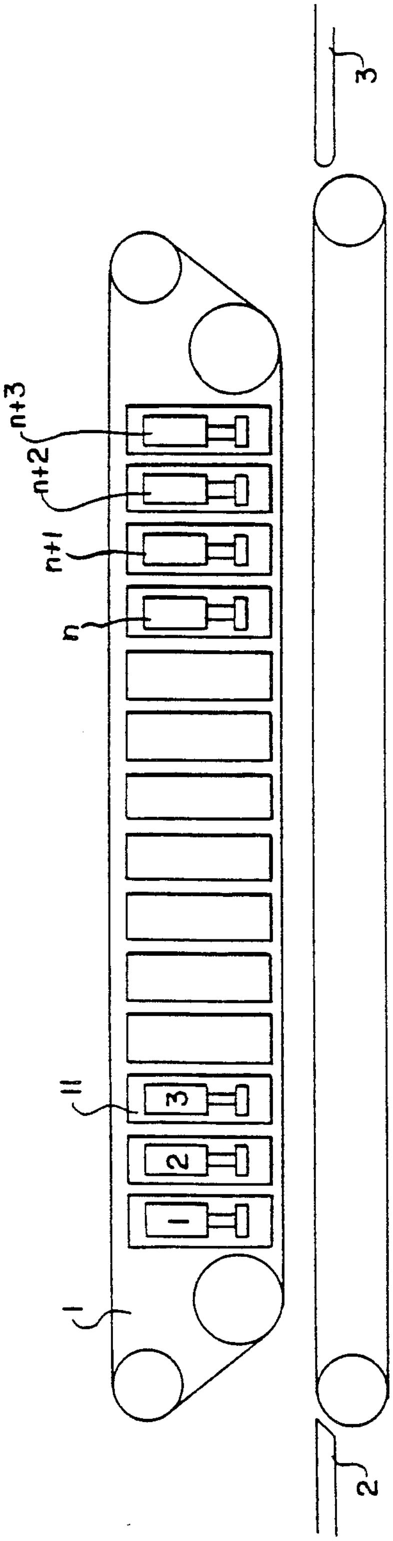
FIG. 1B PRIOR ART
Figure 2A:
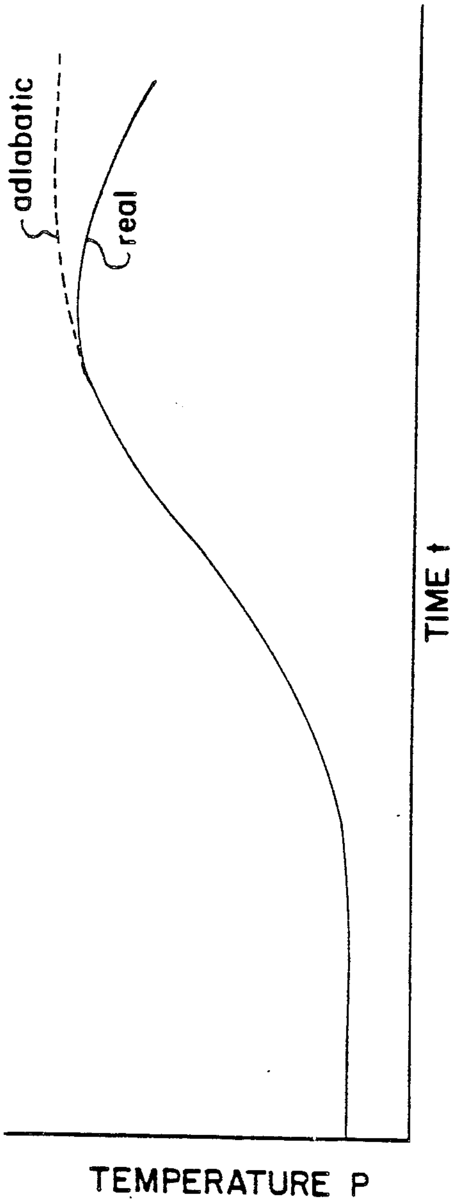
FIG. 2 shows a pressure vs.time curve and temperature vs. time curve for the hydration process.
Figure 2B:
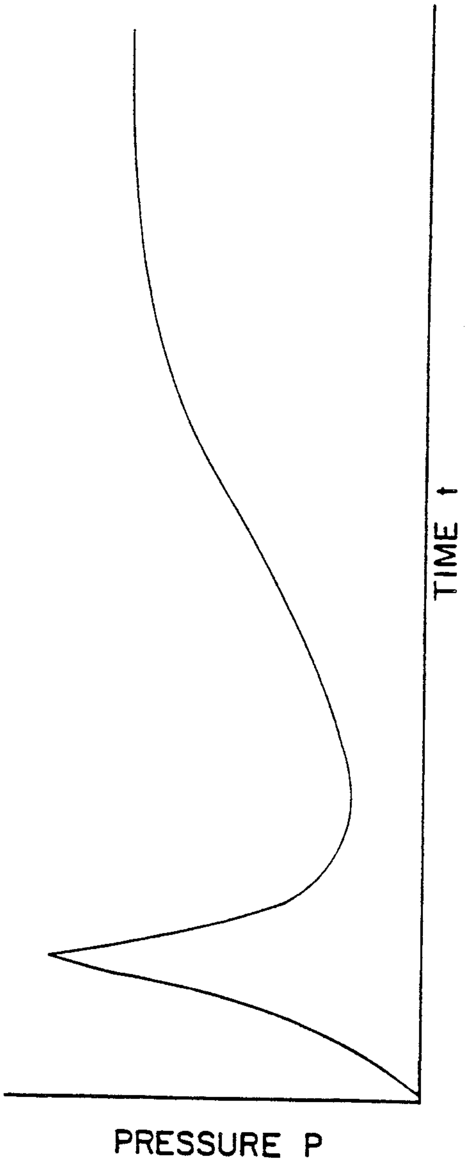

Shown in FIG. 1 is a belt-type press 1 comprising a plurality of press segments 4 numbered 1, 2, 3 . . . n+2, n+3, joined in tandem arrangement. FIG. 1 also shows a transfer device 2 with non-woven material and a board removal device 3.

Figure 3:
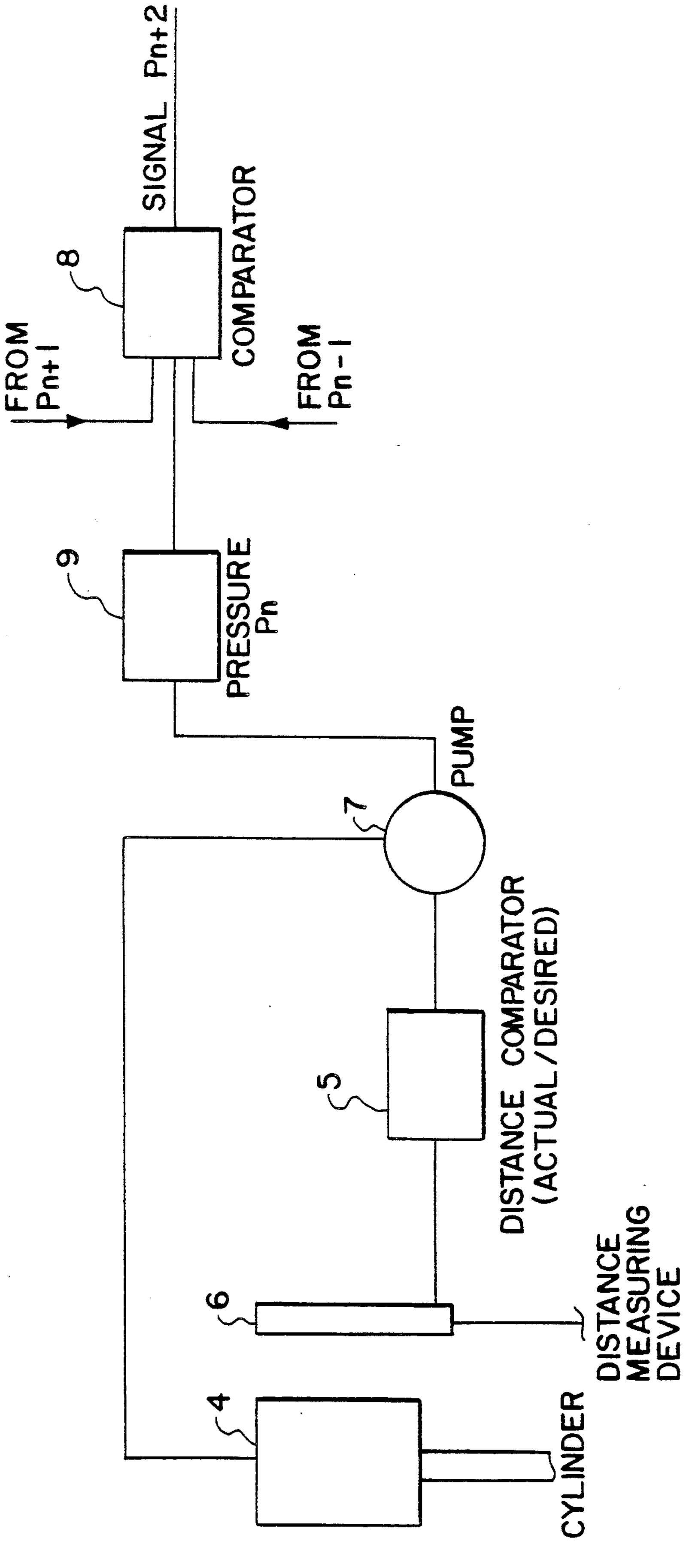
FIG. 3 shows schematically pressure gauging means and control means for a press segment.

FIG. 3 illustrates the pressure gauging provisions and the control system used in conjunction with the press segments. The apparatus includes, for each press segment 4, a reference/actual value comparator 5, a distance-measuring means 6, a pump 7, and a pressure transducer means 9. Moreover, the pressure transducer means 9 of each press segment 4 is connected to a comparator 8.

One advantage of the present invention resides in the aspect that the distance-measuring equipment is provided in the prior art belt-type presses so far known. As supplementary equipment, only transducers 9 and a comparator 8 are necessary to compare the individual pressure levels prevailing in the individual press segments.

Pressure transducer means 9 may directly measure the swelling pressure exerted on its respective press segment. Alternatively the transducer may measure the fluid pressure produced by its respective pump 7, on the assumption that the fluid pressure is proportional to the swelling pressure to be overcome.

When a gypsum-water mixture is fed through the non-woven transfer device 2 into the press, the material is compacted by the belt-type press 1 in compliance with the set specifications (e.g. the predetermined thickness of the board). The necessary pressure is applied by individual press segments 4 (corresponding to the cylinders). Whenever the distance-measuring equipment 6 in combination with comparator 5 detects a variation from the reference or set value, the pump 7 provides for the appropriate fine adjustment such that the predetermined thickness may continuously be retained. In accordance with the present invention, the swelling pressure values are measured and transmitted by transducer 9 to the comparator 8. When the conditions $P_{(n-1)} < P_n$ and $P_{(n+1)} \leqq P_n$ are satisfied, the controller switches the following press segment (n+2) to zero pressure. This operation is illustrated by the example of two measuring points in FIG. 4.

Figure 4:
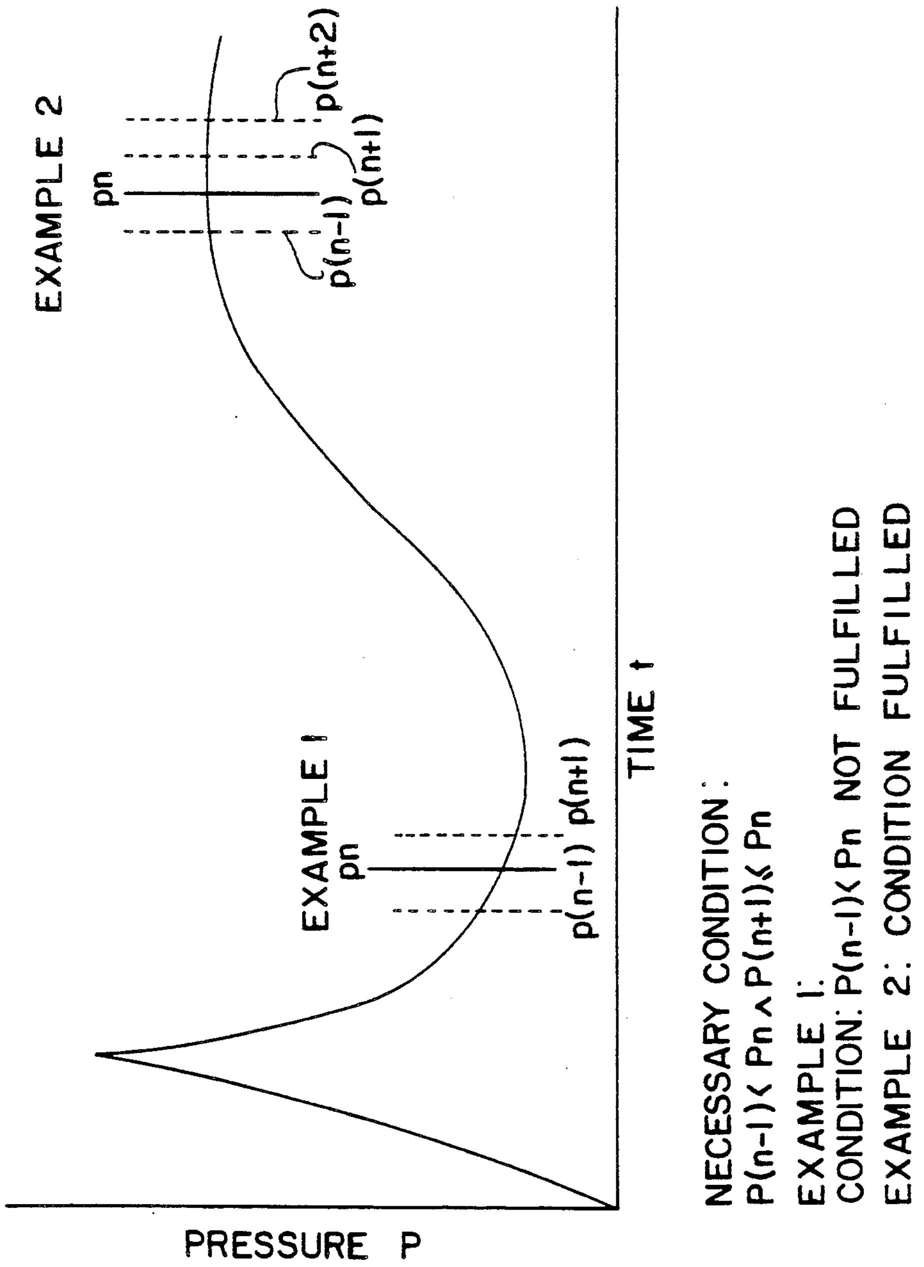
FIG. 4 is a graph of the characteristic trend of swelling pressure vs. time.

FIG. 4 illustrates the characteristic trend of the swelling pressure versus time. In that figure, in Example 1 the condition $P_{(n-1)} < P_n$ is not satisfied. In this case the following press segment is therefore not set to zero pressure. Example 2 illustrates the case where the condition $P_{(n-1)} < P_n$ and $P_{(n+1)} \leqq P_n$ is satisfied. In that case the following press segment is consequently set to zero pressure. The remaining press segments are therefore no longer required to remain operative. In this manner the overall system may be precisely controlled and is suitable for operation at minimum energy consumption.

In conclusion, the present invention is the first to show a way of optimum control of a continuous belt-type press at a low expenditure in terms of equipment. The further advantage resides in the aspect that the inventive method may be carried out with employment of system components which are available already in the common prior art belt-type presses. In accordance with the present invention, the swelling pressure is used as a control parameter while the appropriate apparatus is defined.

What is claimed is:

1. Method for controlling compaction pressure and thickness of a gypsum-cemented workpiece during continuous manufacture thereof, comprising the steps of:

depositing gypsum undergoing hydration and water on a lower belt of a belt-type press, the press having an upper belt comprising a plurality of press segments joined in tandem relationship and positioned at a predetermined distance from the lower belt for controlling workpiece thickness;

allowing the deposited gypsum undergoing hydration to swell while being restrained by the upper belt, thereby causing compaction pressure to be applied to the gypsum, by the upper belt and the press segments, and thereby generating in the gypsum a swelling pressure which increases over the course of hydration of the gypsum as a result of the swelling of the gypsum;

continuously measuring the distance between each press segment and the lower belt and the swelling pressure of the gypsum at each press segment and comparing each measured distance with the predetermined distance and comparing the measured swelling pressure at each press segment with the measured swelling pressure at other press segments;

adjusting the compaction pressure of the press segments based on the distance and swelling pressure comparisons, to achieve a gypsum-cemented workpiece of predetermined thickness; and terminating the compaction pressure when:

(a) the measured swelling pressure ceases to increase between consecutive press segments, thereby indicating substantial completion of hydration; or (b) a predetermined swelling pressure is measured, prior to substantial completion of hydration; or (c) a predetermined $dP_Sdt$ is achieved, $P_S$ being swelling pressure and t being time, prior to substantial completion of hydration.

2. Method according to claim 11, wherein the compaction pressure is terminated for the gypsum when the hydration is substantially complete.

3. Method according to claim 11, wherein the compaction pressure P for each of the press segments 1, 2 . . . n+1, n+2, is automatically controlled by means of the measured swelling pressure, and the compaction pressure of segment n+2 is set to zero when conditions $P_{(n+1)} < P_n$ and $P_{(n+1)} \leqq P_n$ are satisfied.

4. Method according to claim 11, wherein the compaction pressure is terminated when a predetermined swelling pressure is measured.

5. Method according to claim 1, comprising determining a derivative $dP_S/dt$, wherein $P_S$ is swelling pressure and t is time, and using the derivative for adjusting the compaction pressure.

6. Method according to claim 5, wherein the compaction pressure is terminated at a predetermined dPs/dt.

7. Apparatus for continuous production of gypsum-cemented workpieces, wherein compaction pressure and thickness of the gypsum-cemented workpieces are controlled during the continuous production, comprising:

first belt means for transporting gypsum undergoing hydration;

means for applying compaction pressure to the gypsum undergoing hydration, comprising a second belt means and a plurality of press segments arranged to apply the second belt means to the gypsum, and joined in tandem;

each of the press segments comprising means for determining a distance between a respective press segment and the first belt means, means for comparing the determined distance with a predetermined distance, pump means for actuating the respective press segment and setting its distance from the first belt means by application of pressure to control the thickness of the gypsum, and means for determining swelling pressure of the gypsum being compacted by the respective press segment;

means for comparing the determined swelling pressures of the gypsum compacted by each of the respective press segments; and means for terminating compaction pressure applied to the gypsum by the press segments in response to the comparison of the swelling pressures of the gypsum.

8. Apparatus according to claim 7, wherein each means for determining the swelling pressure of the gypsum comprises means for measuring pump pressure in the respective press segment.

9. Apparatus according to claim 8, additionally comprising means for adjusting the compaction pressure applied by each press segment.

10. Apparatus according to claim 8, additionally comprising a pressure transducer means connected to the means for comparing the determined swelling pressures.

* * * * *